A. D. GILBERT.
FISH HOOK.
APPLICATION FILED DEC. 12, 1917.

1,259,390.

Patented Mar. 12, 1918.

Arthur D. Gilbert
Inventor

By Geo. P. Kimmel
Attorney

UNITED STATES PATENT OFFICE.

ARTHUR D. GILBERT, OF LOST CABIN, WYOMING.

FISH-HOOK.

1,259,390.

Specification of Letters Patent. Patented Mar. 12, 1918.

Application filed December 12, 1917. Serial No. 206,803.

*To all whom it may concern:*

Be it known that I, ARTHUR D. GILBERT, a subject of the King of Great Britain, residing at Lost Cabin, in the county of Fremont and State of Wyoming, have invented certain new and useful Improvements in Fish-Hooks, of which the following is a specification.

This invention relates to fishing appliances and it is the principal object of the invention to provide an improved spring actuated hook having a plurality of impaling members which when struck by a fish will be instantly released, thus ensnaring the fish and insuring positive engagement of the impaling members therewith to permit the landing of the same.

Another and equally important object of the invention is to provide novel means for securing the hooks or impaling members in set positions and allowing them to be automatically released when engaged by a fish.

Among other aims and objects of the invention may be recited, the provision of a device of the character mentioned with a view to compactness, and in which the number of parts are few, the construction simple, the cost of production small, and efficiency and operation high.

The foregoing together with additional advantageous details and arrangement of parts of the preferred embodiment of my invention will be clear from the specific description hereinafter contained, when read in connection with the accompanying drawings forming part thereof, wherein said embodiment of the invention is illustrated for the purpose of facilitating a full understanding of the present improvements.

In the drawings:—

Figure 1:
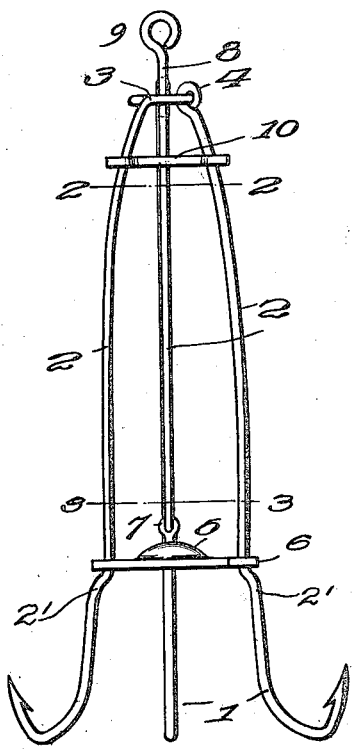
Figure 1 is a side elevation of the improved hook.
Figure 4:
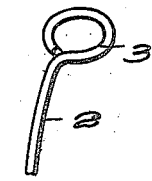
Fig. 4 is a fragmentary detail of one of the shanks.
Figure 2:
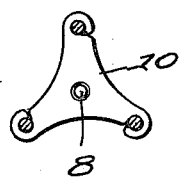
Fig. 2 is a horizontal section taken on line 2—2 of Fig. 1.
Figure 3:
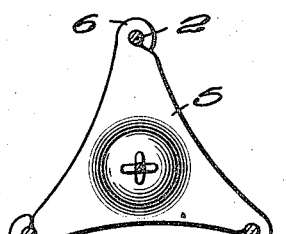
Fig. 3 is a similar section taken on line 3—3 of Fig. 1.

Having more particular reference to the drawings, in connection with which like reference characters will designate corresponding parts throughout the several views, the numeral 1 represents a plurality of hooks, the said hooks being provided with slightly offset curved spring shanks 2, one of said shanks having a ring 3 formed upon its upper end while the remaining shanks are looped as at 4 and engaged with said ring, thereby interconnecting all of the shanks.

Slidably engaged with the curved spring shanks of the hook or impaling members 1 is a latch or retaining member 5, the same consisting of a curved body portion having a plurality of radially disposed arms 6 formed thereon, the ends of said arms being bent about the shank portions 2 in order that the same will be slidably engaged therewith. To limit sliding movement of the latch or receiving member 5 along the shanks 2, the same may be and preferably are off-set as at 2'. An eye 7 or the like is concentrically engaged with the latch 5 and is in turn, connected to a releasing connection 8, which is in form of braided wire, cord or the like. In its preferable embodiment, the releasing connection 8 is formed of braided wire having the upper end of the same looped as at 9 to permit engagement of one end of a fishing line therewith.

A stay or bracing element 10 having radially disposed arms is arranged between the upper portions of the shanks 2 and as will be noted, has the arms thereof engaged with said shanks, the center portion of the stay being apertured to loosely receive the releasing connection 8 therethrough.

When using my improved spring actuated hook, bait is of course arranged upon the impaling members or hooks 1 and the looped end 9 of the connection 8 is engaged with one end of a fishing line. As the fish strikes the hook and carries the same, the latch 5 will, due to its connection with the releasing connection 8, be moved upwardly over the spring shanks 2, thus releasing the same and permitting the hooks 1 to be instantly sprung outwardly, thereby impaling the fish. It will be also understood, that the user of the improved hook may by abruptly pulling the line connected to the connection 8 cause the hooks 1 to be instantly released, due to the upward movement of the latch 5 over the shanks 2 of the same. Thus, the device is rendered effective in instances where the fish merely "nibbles" at the bait.

Manifestly, the construction shown is capable of considerable modification and such modification as is within the scope of my claims, I consider within the spirit of my invention.

I claim:—

In a device of the character described, a plurality of hooks having elongated spring shanks, the upper end of one of said shanks being bent to form a ring and the upper ends of the remaining shanks being looped about said ring, latching means slidable on the shanks, and a releasing connection secured to said latching means.

In testimony whereof, I affix my signature hereto.

ARTHUR D. GILBERT.